Nov. 29, 1938.   D. COMINO   2,138,293
GAUGE DEVICE
Filed Dec. 12, 1936

Inventor,
Demetrius Comino
Per, Sommers-Young
Attys

Patented Nov. 29, 1938

2,138,293

UNITED STATES PATENT OFFICE 2,138,293

GAUGE DEVICE

Demetrius Comino, London, England

Application December 12, 1936, Serial No. 115,605
In Great Britain September 21, 1936

4 Claims. (Cl. 33—184.5)

This invention concerns improvements relating to gauges for use in making up print and for similar purposes in connection with printing.

The principal object of the invention is to provide an extremely simple and inexpensive gauge which is capable of being used for a wide variety of purposes, particularly for assisting in the performance of justifying and checking registering, aligning, squaring and like operations in connection with the make-up of forms and printed matter on paper and for squaring, positioning and like operations in connection with the mounting and arrangement of blocks or "cuts".

With this object in view, the gauge according to the invention comprises a sheet of ruled transparent material having a straight ledge or ledges or like abutment or stop means formed or provided at one of its edges.

Preferably the gauge according to the invention comprises a sheet of cross-ruled transparent flexible material and abutment-means or aligned stop-means located along one of the edges of the sheet and projecting perpendicularly from its face, the lines of the cross-ruling being respectively parallel and perpendicular to the line of the abutment or stop means.

One embodiment of the invention by way of example will now be more fully described by reference to the accompanying drawing, in which:—

Figure 1:
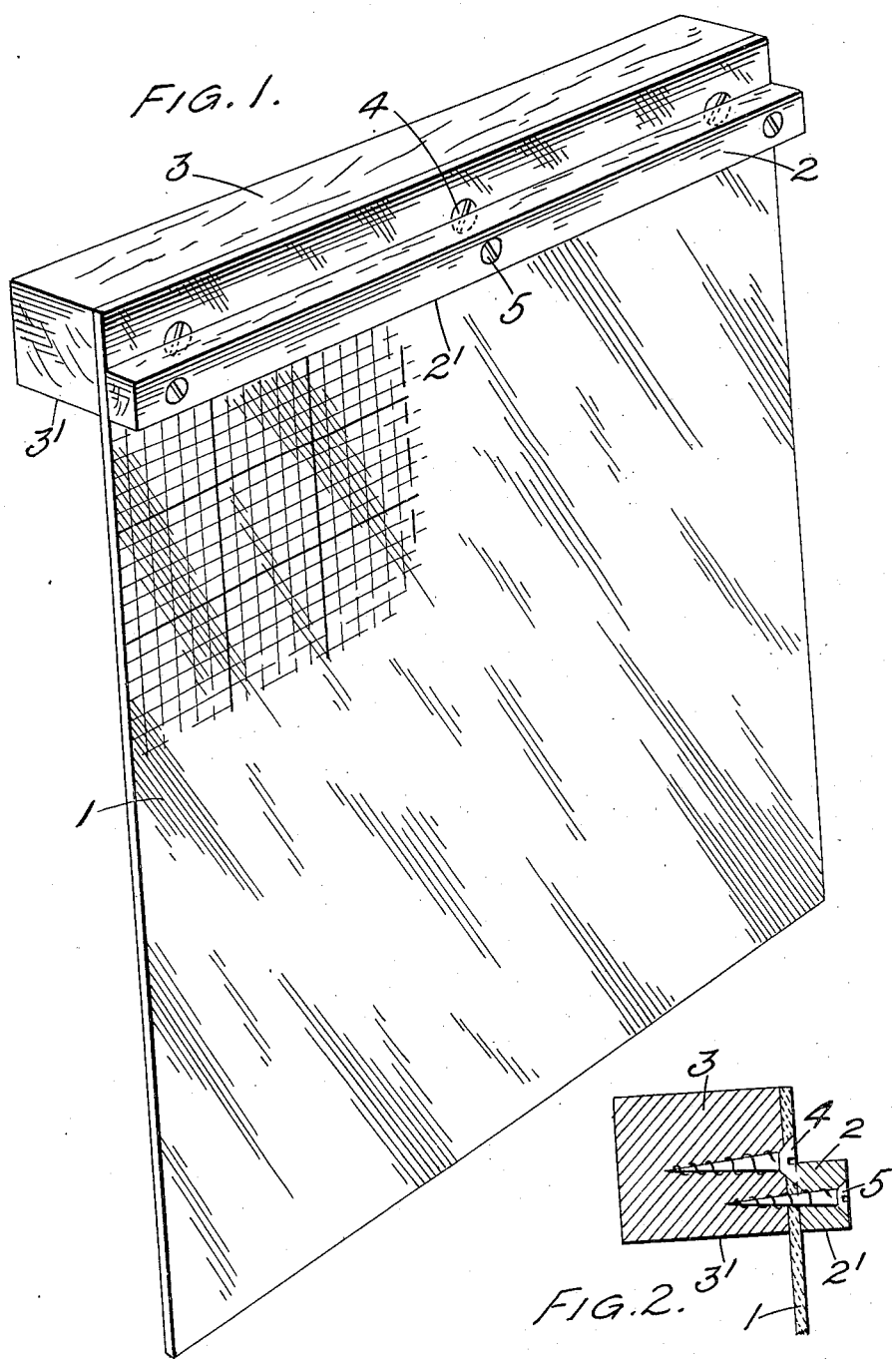
Fig. 1 is a perspective view of the gauge.

The gauge comprises a sheet 1 of cross-ruled transparent material. The material should be fairly stiff, for example celluloid between $\frac{1}{32}$ and $\frac{1}{16}$ inch thick. The size and shape of the sheet will naturally depend upon the size of the form or other work with which the gauge will most commonly be used. The drawing illustrates a relatively small gauge-device. The size of square into which the sheet is cross-ruled may also depend upon circumstances, but a convenient size is approximately six squares to the inch (pica). A part of the sheet is shown so ruled in Fig. 1. For convenience, more pronounced ruling may be provided at regular intervals. In Fig. 1, every sixth line down and across is ruled with a wider or darker line. The ruling may be scored upon one surface of the transparent material and the lines of scoring may be filled with black ink or the like. In the example illustrated, the scoring is on the front side of the transparent sheet in Fig. 1.

Figure 2:
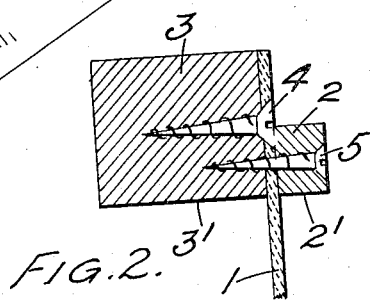
Fig. 2 is a section through the upper part of the gauge.

Preferably two straight ledges 2, 3 are provided, one on each side of the sheet 1. The faces $2^1$, $3^1$ of the two ledges are in the same plane perpendicular to the plane of the sheet 1 and are in accurate parallel and perpendicular relationship with the lines of the cross-ruling. The ledge 2 is relatively shallow and may be made as narrow as is practically possible. It should be made so shallow that when the sheet 1 is placed upon the printing surface of type, the said ledge can extend down into a gap formed by spacing means between the type proper without resting upon the said spacing means. This ledge 2 is made narrow in order that it may enter within a relatively narrow gap formed by a line of type-spacing means. The other ledge 3, in the example shown, is both deeper and wider. The ledges 2, 3, which may suitably be made of wood, may be secured on each side of the upper edge of the sheet by screws in the manner illustrated in Fig. 2. The sheet 1 is secured to the larger ledge 3 by screws 4 and the smaller ledge 2 is then secured by screws 5 passing through the sheet into the ledge 3. At the end remote from the ledges, the sheet may be provided with a hole by which the gauge-device can be hung up when not in use.

The precise manner of use of the gauge-device will depend upon the particular work being done, as will be apparent to those skilled in the printing art. In general, the transparent sheet 1 is laid upon the printing surface of the type or the like and one of the ledge-faces $2^1$, $3^1$ is abutted against an appropriate straight edge. The cross-rulings then enable alignments, positions and so forth to be carefully checked. The ledge 2 is employed when it is undesirable or inconvenient to use a side-edge of a form, block or the like as a datum. It enables the side-edge of, say, a line of type to be used as a datum from which the registering, aligning or other operation is performed. The ledge 3 is employed where the side-edge of the form, block or the like can conveniently be used as a datum.

If desired, the transparent sheet 1 or the ledges 2, 3 may be provided with further markings, such as scales required for particular purposes in the printing art.

I claim:—

1. A gauge for use in the printing art for registering, aligning, or other operation, comprising a sheet of transparent material cross-ruled in printers' units of measure, an abutment member secured to one side of said sheet at an edge thereof, said member having a straight edge accurately positioned with respect to the rulings on said sheet to constitute an abutment ledge and having sufficient depth or thickness to permit engagement with an edge of a block or form from which the registering, aligning or other operation may be performed, and a second abutment member secured to the opposite side of said sheet at the same edge thereof, said second abutment member also having a straight edge likewise positioned to constitute an abutment-ledge but being narrower and shallower than the first abutment ledge to permit insertion between the type in a relatively narrow gap formed by a line of normal type-spacing means, which gap is inaccessible to said first abutment member, the said second abutment edge being so shallow that when inserted in the gap between the type it does not contact the type spacing means therein, said second abutment face being adapted to engage a side edge of a line of type as datum for measurement, the abutment faces of the two abutment ledges being parallel and in the same plane.

2. A gauge for use in the printing art for registering, aligning, or other operation, comprising a sheet of transparent material cross-ruled in printers' units of measure, an abutment member located on one side of said sheet at an edge thereof, said member having a straight edge accurately positioned with respect to the rulings on said sheet to constitute an abutment ledge and having sufficient depth or thickness to permit engagement with an edge of a block or form from which the registering, aligning or other operation may be performed, and a second abutment member located in the opposite side of said sheet at the same edge thereof, said second abutment member also having a straight edge likewise positioned to constitute an abutment-ledge but being narrower and shallower than the first abutment ledge to permit insertion between the type in a relatively narrow gap formed by a line of normal type-spacing means, which gap is inaccessible to said first abutment member, the said second abutment edge being so shallow that when inserted in the gap between the type it does not contact the type spacing means therein, said second abutment face being adapted to engage a side edge of a line of type as datum for measurement, the abutment faces of the two abutment ledges being parallel and in the same plane, and means extending from the second abutment member through the transparent sheet of material and into the first-mentioned abutment member for attaching said narrow second abutment member securely and fixedly with respect to the ruled transparent sheet.

3. A gauge for use in the printing art for registering, aligning, or other operation, comprising a sheet of transparent material cross-ruled in printers' units of measure, an abutment member secured to one side of said sheet at an edge thereof, said member having a straight edge accurately positioned with respect to the rulings on said sheet to constitute an abutment ledge and having sufficient depth or thickness to permit engagement with an edge of a block or form from which the registering, aligning or other operation may be performed, said abutment having sufficient width to prevent its insertion in the spaces between type produced by normal type spacers.

4. A gauge for use in the printing art for registering, aligning, or other operation, comprising a sheet of transparent material cross-ruled in printers' units of measure, an abutment member secured to one side of said sheet at an edge thereof, said member having a straight edge accurately positioned with respect to the edge accurately positioned with respect to the rulings on said sheet to constitute an abutment ledge of narrow and shallow dimensions, the width being sufficiently narrow to permit insertion between the type in a relatively narrow gap formed by a line of normal type-spacing means, and the depth being sufficiently shallow that when inserted in a gap between the type it does not contact the type-spacing means therein, so that the face of said abutment is free to engage a side edge of a line of type as datum for measurement.

DEMETRIUS COMINO.